United States Patent [19]
Novotny

[11] Patent Number: 6,094,973
[45] Date of Patent: Aug. 1, 2000

[54] METHOD AND APPARATUS FOR MECHANICAL SCREENING OF MAGNETIC RECORDING DISK DRIVES

[75] Inventor: Vlad Joseph Novotny, Los Gatos, Calif.

[73] Assignee: Seagate Technology, Inc., Scotts Valley, Calif.

[21] Appl. No.: 09/132,283

[22] Filed: Aug. 11, 1998

Related U.S. Application Data

[60] Provisional application No. 60/055,739, Aug. 11, 1997.
[51] Int. Cl.[7] ........................................................ G01B 5/28
[52] U.S. Cl. ................................................................ 73/105
[58] Field of Search ...................... 73/105, 660; 360/103, 360/137

[56] References Cited

U.S. PATENT DOCUMENTS

| | | | |
|---|---|---|---|
| 4,532,802 | 8/1985 | Yeack-Scranton et al. | 73/866.4 |
| 5,168,412 | 12/1992 | Doan et al. | 360/103 |
| 5,880,587 | 3/1999 | Annis et al. | 360/103 |

*Primary Examiner*—John E. Chapman
*Attorney, Agent, or Firm*—Jonathan E. Olson; Shawn B. Dempster; Edward P. Heller, III

[57] ABSTRACT

The invention uses piezoelectric sensors to test disk drives. Both contact start-stop and load-unload type disk drives may be tested. A piezoelectric sensor is affixed to a disk drive to test for disk drive mechanical integrity. One method of affixing the sensor to the disk drive is using a mechanical clamp. The clamp is intended for repeated use on many disk drives, and therefore its easy removal is important. An alternative clamping apparatus is a magnetic clamp. In use, the clamp affixes the piezoelectric sensor to a disk drive in an optimal location with optimal force. Affixed piezoelectric sensors are used to detect aberrant behavior generated by non-optimal disk drive performance. The clamp/sensor combination detects acoustic signal in a disk drive which is used to determine whether or not a disk drive has adequate head-disk clearance. The apparatus is flexible, allowing testing after assembly of head-disk assembly and before or after servowriting and final disk drive assembly. Furthermore, the piezoelectric sensors may be permanently affixed to optimal locations on disk drives using glue, epoxy, or other adhesives. The permanently affixed piezoelectric sensors provide the same information as more temporarily mounted sensors and, additionally, the permanently affixed sensors may be left on the disk drive and used to measure disk drive performance throughout the life of the disk drive. The sensors can provide output signal in a number of configurations, such as, having a single point signal with one electrode grounded, or a floating differential signal. This sensor signal is analyzed by sending the signal through a signal processing apparatus which examines specific disk drive performance parameters which are used to determine whether the disk drives being tested meet preset specifications.

18 Claims, 13 Drawing Sheets

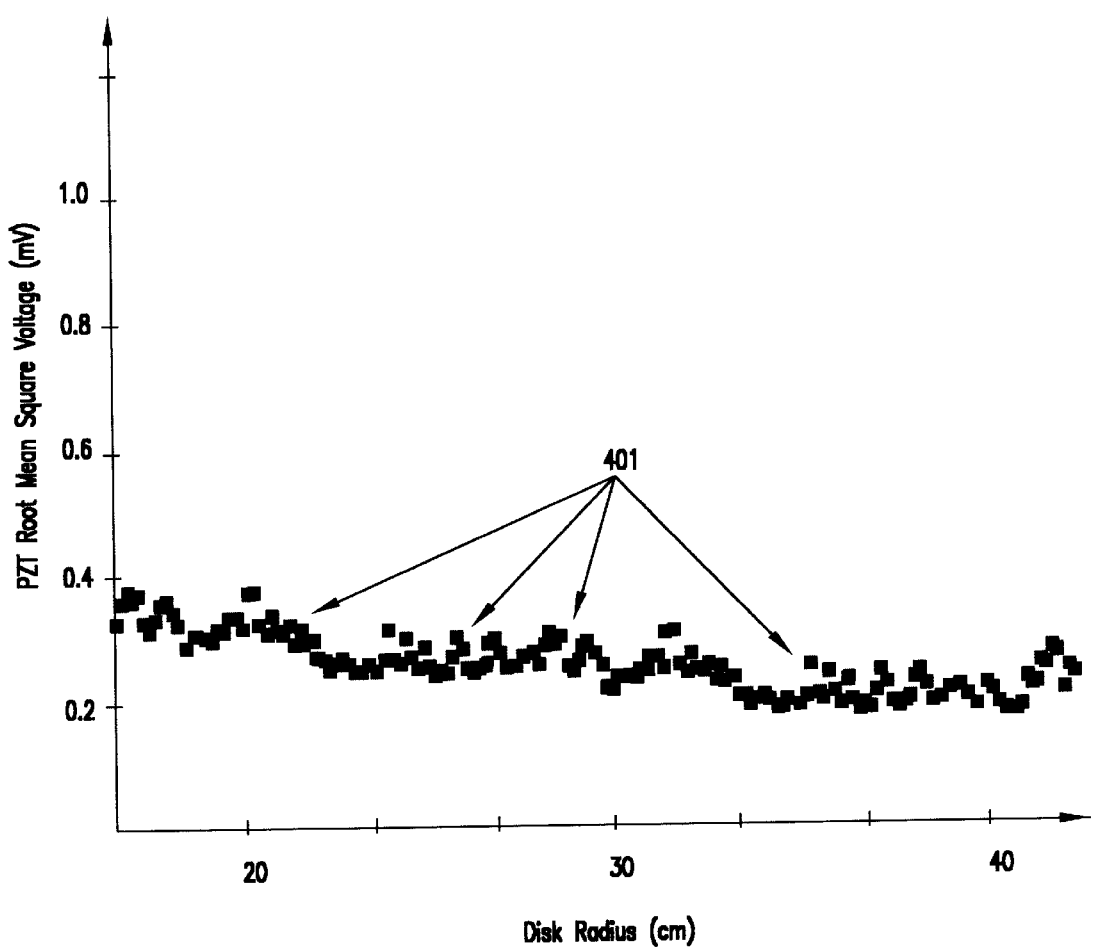

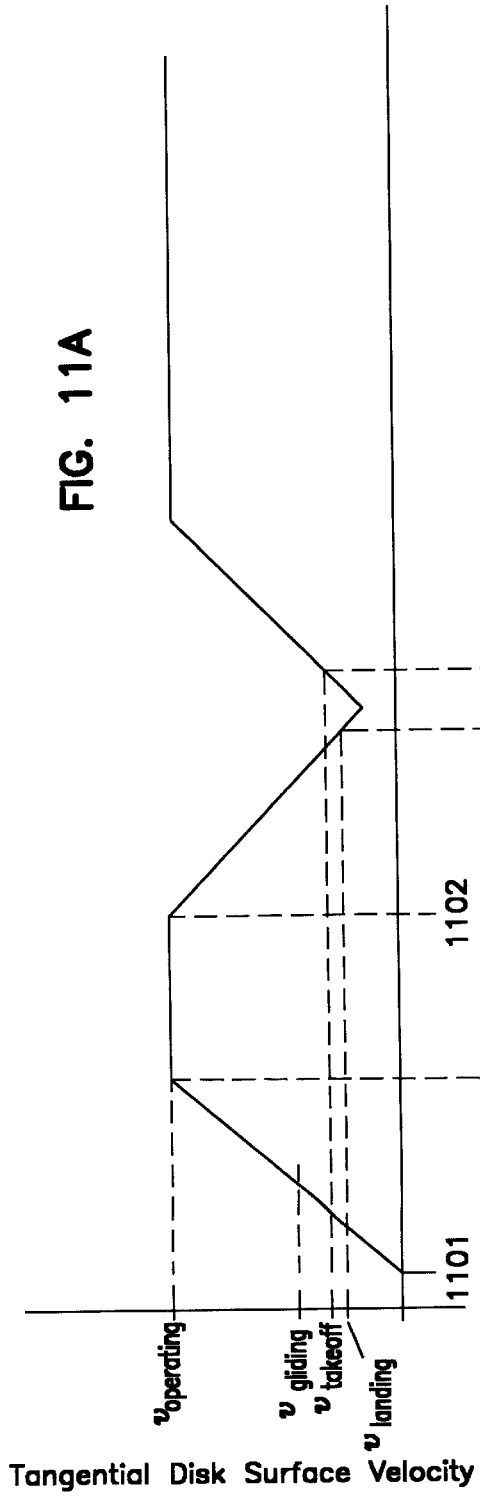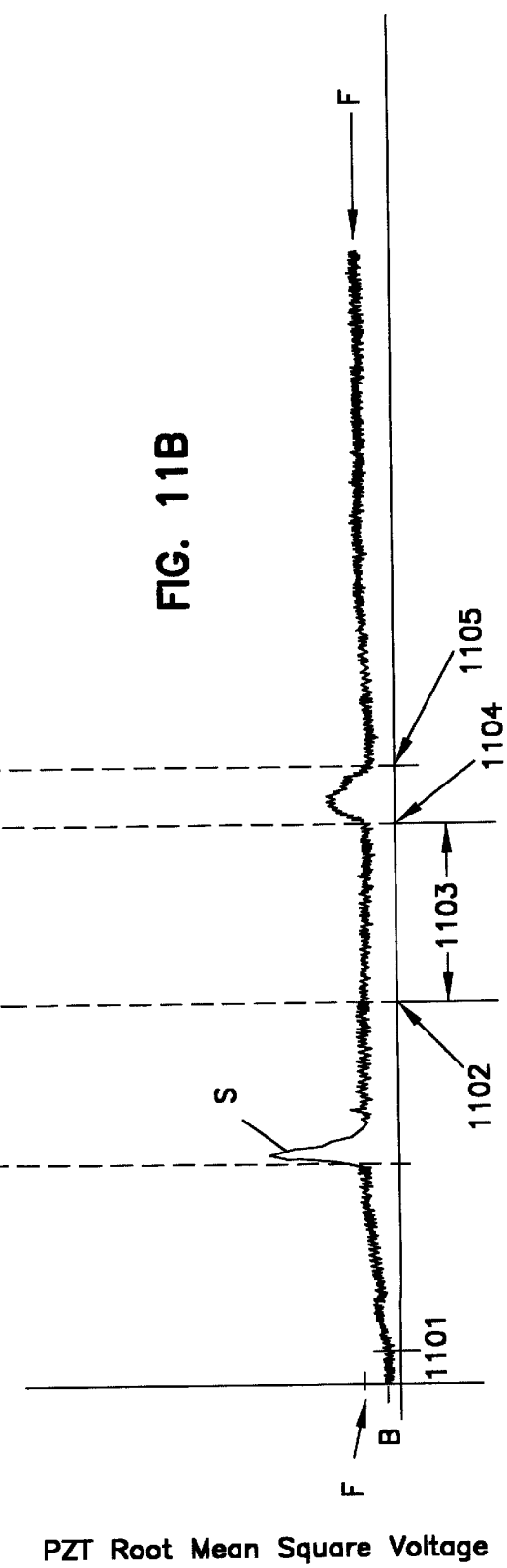

6,094,973

METHOD AND APPARATUS FOR MECHANICAL SCREENING OF MAGNETIC RECORDING DISK DRIVES

RELATED APPLICATIONS

This invention is related to, and hereby claims priority from, U.S. Provisional Patent Application Ser. No. 60/055,739, filed Aug. 11, 1997, titled "Mechanical Screening Device for Magnetic Recording Drives".

FIELD OF INVENTION

The present invention is a method and apparatus for mechanically testing magnetic recording disk drives for mechanical integrity. The invention uses piezoelectric transducers (PZT) as sensors to detect aberrant vibration and acoustic waves generated by non-optimal disk drive performance caused by head-disk contact. The present invention may be used to test disk drive components either before or after final assembly to ensure that they meet specifications. The invention is used to collect and analyze disk drive information and make a determination of disk drive quality and suitability for use.

BACKGROUND OF THE INVENTION

During disk drive manufacture, mechanical components must be precisely assembled with extremely narrow tolerances so that the completed device performs to specifications and has good long-term reliability. To facilitate this, individual components are usually tested, electrically, magnetically, and mechanically, prior to assembly. However, adequate pre-assembly performance does not assure that the components are within specifications after assembly. Typically, after assembly and servowriting, a disk drive is tested for magnetic performance. Unfortunately, this post-assembly testing is not sufficient because magnetic performance testing does not guarantee mechanical reliability. In fact, drives featuring excellent magnetic performance often exhibit the worst mechanical performance. This is a consequence of the fact that magnetic performance improves with decreasing magnetic head-disk spacing, whereas mechanical reliability deteriorates with decreasing physical head-disk separation. Due to this dichotomy between mechanical and magnetic performance, screening for mechanical performance prior to servowriting the head-disk assembly and/or after final assembly of the disk drive could eliminate the risk of shipping unreliable disk drives to customers. Moreover, if such problems are detected before servowriting, considerable time and expense involved in the completion and testing of the disk drives could be saved. A mechanical head-disk spacing test can improve quality, reduce the incidence of mechanical failures, and increase the yield in disk drive assembly and testing. Thus, there is a need for a method and apparatus which quickly and easily tests disk drives for adequate head-disk spacing as well as overall mechanical reliability. It is the primary object of the present invention to meet this need.

SUMMARY OF THE INVENTION

The present invention accomplishes the foregoing object by using a piezoelectric sensor optimally located on the head-disk assembly to collect and analyze signals during disk drive take-off, landing, flying, seeking, and parking. The sensor is fixed with optimal force and provides an electrical signal which is subsequently processed and analyzed to make determinations as to whether the tested disk drive meets specifications. The sensor may be clamped temporarily on the head-disk assembly or alternatively, permanently attached to the drive while accomplishing the same task.

BRIEF DESCRIPTION OF THE DRAWINGS

For a more complete and accurate understanding of the present invention, reference is made to the accompanying drawings in the following "Detailed Description of the Invention". The reference numbers are intended to refer to the same or equivalent features throughout the specification and several drawings.

FIG. 4A is a glidemap graph showing the relationship between PZT voltage and disk radius.

FIG. 11A is a graph of a typical load-unload disk drive run cycle showing tangential disk surface velocity as a function of time.

FIG. 11B is a graphical representation of the relationship between PZT voltage over time as related to the load-unload disk drive run cycle of FIG. 11A.

DETAILED DESCRIPTION OF THE INVENTION

A head-disk assembly is typically comprised of several coaxial magnetic storage disks where magnetic patterns are stored. Each disk has a magnetic read/write head flying over it. It is the precisely controlled distances between the disk surface and the read/write head that makes disk drive operation possible. Should the head come too close to the disk surface, the resulting collision may do serious damage to the disk drive which can lead to disk drive failure. During physical head-disk interaction (collisions) an acoustic wave is generated in the head-disk assembly. This acoustic wave may be sensed using an appropriate detector, for example, a PZT. The detection and measurement of this acoustic wave is at the heart of the present invention.

Figure 1A:
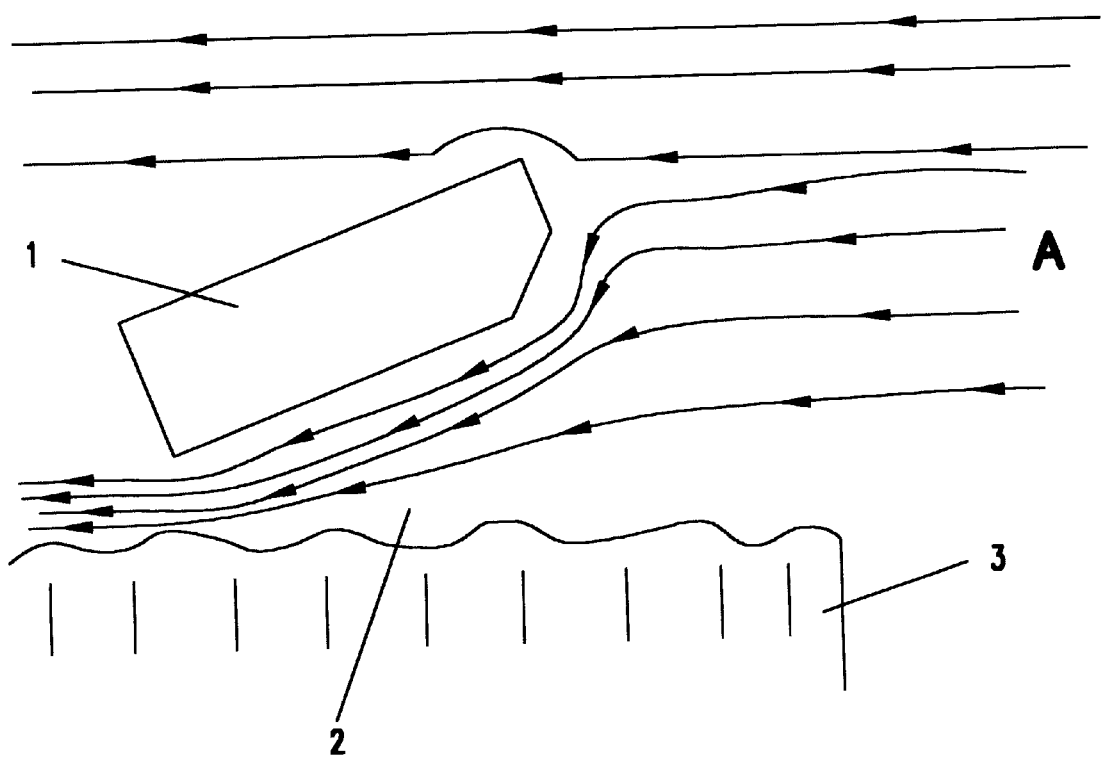
FIG. 1A is a schematic representation of the interaction between a typical head, disk surface, air bearing, and airflow during flying.

FIG. 1A schematically shows a typical head-disk interface. A magnetic disk drive head assembly (1) is mounted in close proximity to the disk surface (3). An "air bearing" (2) is formed between the head assembly and the disk surface. Air flow around the head is depicted by the arrows (A). At higher rotational velocities, air pressure in the air bearing builds up and pushes the head away from the disk surface. This pressure pushes the head to an appropriate distance above the disk surface. This distance is known as the head flying height.

Figure 1B:
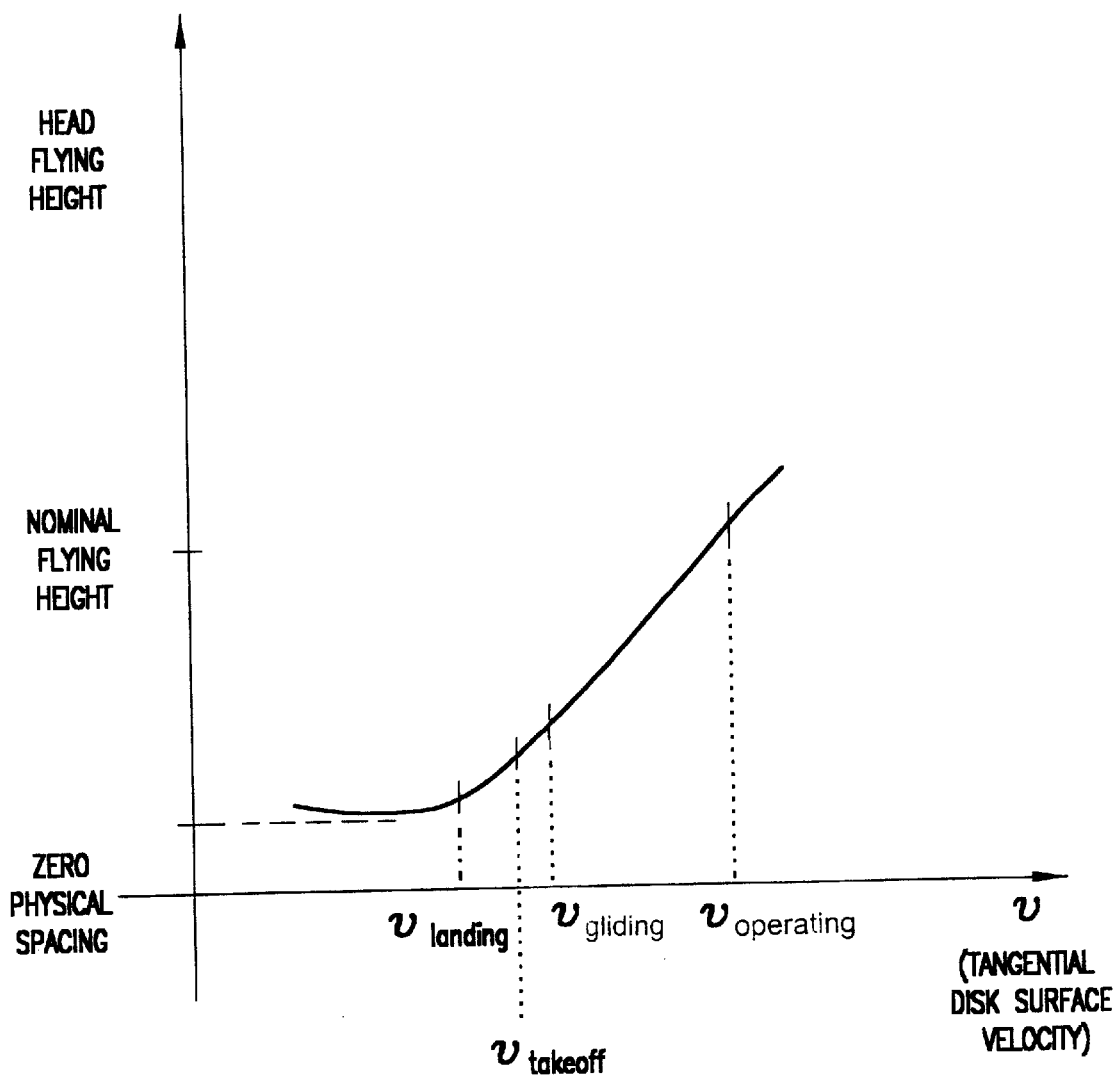
FIG. 1B is a graph of the relationship between head flying height and tangential disk surface velocity.

FIG. 1B graphically shows the approximate relationship between head flying height and tangential disk surface velocity. FIG. 1B shows $v_{takeoff}$ which is the velocity at which the head lifts off the disk surface and ceases making contact. Also shown is $v_{landing}$ which is the velocity at which the head again makes contact with the disk surface during landing. Also shown is $v_{operating}$, which is the velocity at which the head reaches its operational flying height over the disk surface. A velocity, $v_{gliding}$, is also shown and defined, as the tangential disk velocity at which the head has a small physical spacing above the disk surface. This velocity is slightly greater than $v_{takeoff}$ and $v_{landing}$. FIG. 1B shows that, in the region between landing or takeoff tangential velocity and velocity at operational flying height, the relationship between flying height and tangential velocity is approximately linear. Consequently, as long as the velocity at which the head contacts the disk has been determined (i.e. where head-disk spacing is zero), flying height may be predicted using tangential disk velocity. Clock indexes of the spindle or magnetic clock patterns provide an easy way to determine rotational velocity. Once the tangential velocity at which a physical head-disk spacing equal to zero is determined, flying height at $v_{operating}$ may be determined.

Figure 2:
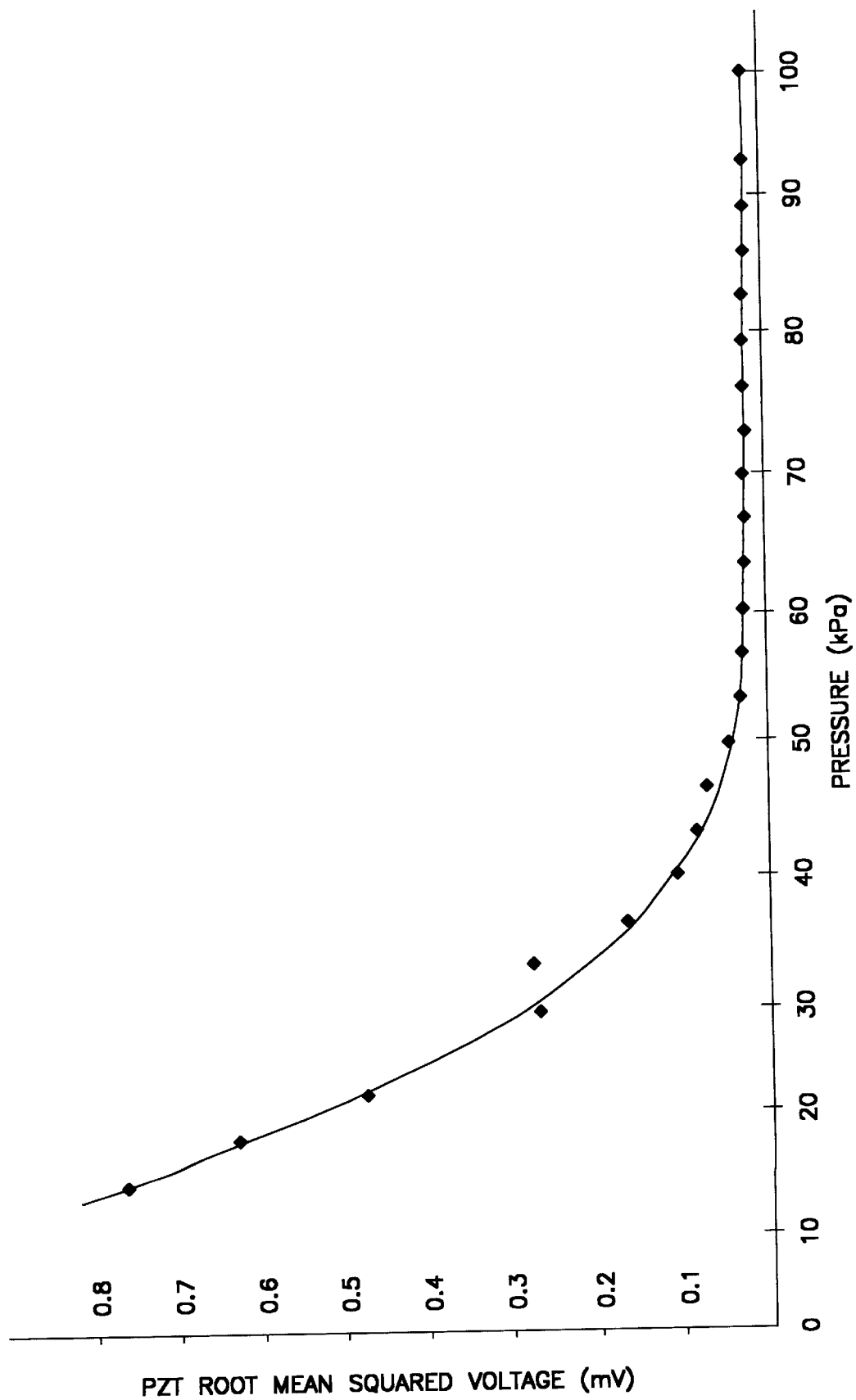
FIG. 2 is a graphical representation of a pressure avalanche describing the relationship between PZT voltage and pressure.

FIG. 2 depicts a pressure avalanche showing the relationship between disk drive operating pressure and PZT signal. Head-disk contact generates acoustic waves that can be detected using sensors, for example, PZT's. Once pressure drops below a certain level (e.g. about 45 kPa), the increasing frequency and magnitude of head-disk contacts causes a voltage avalanche as shown in FIG. 2. The transition point between a regime with frequent head-disk contacts and a regime with few, or no, head-disk contacts can be determined using a PZT. A regime with high PZT voltage reflects frequent head-disk contact and defines a pressure or velocity at which head-disk spacing is at or near zero. At higher pressures or velocities, changes in flying height may be calculated using air bearing modeling or direct calibration (i.e. the flying height is determined by optical measurements a function of pressure or velocity).

Figure 3:
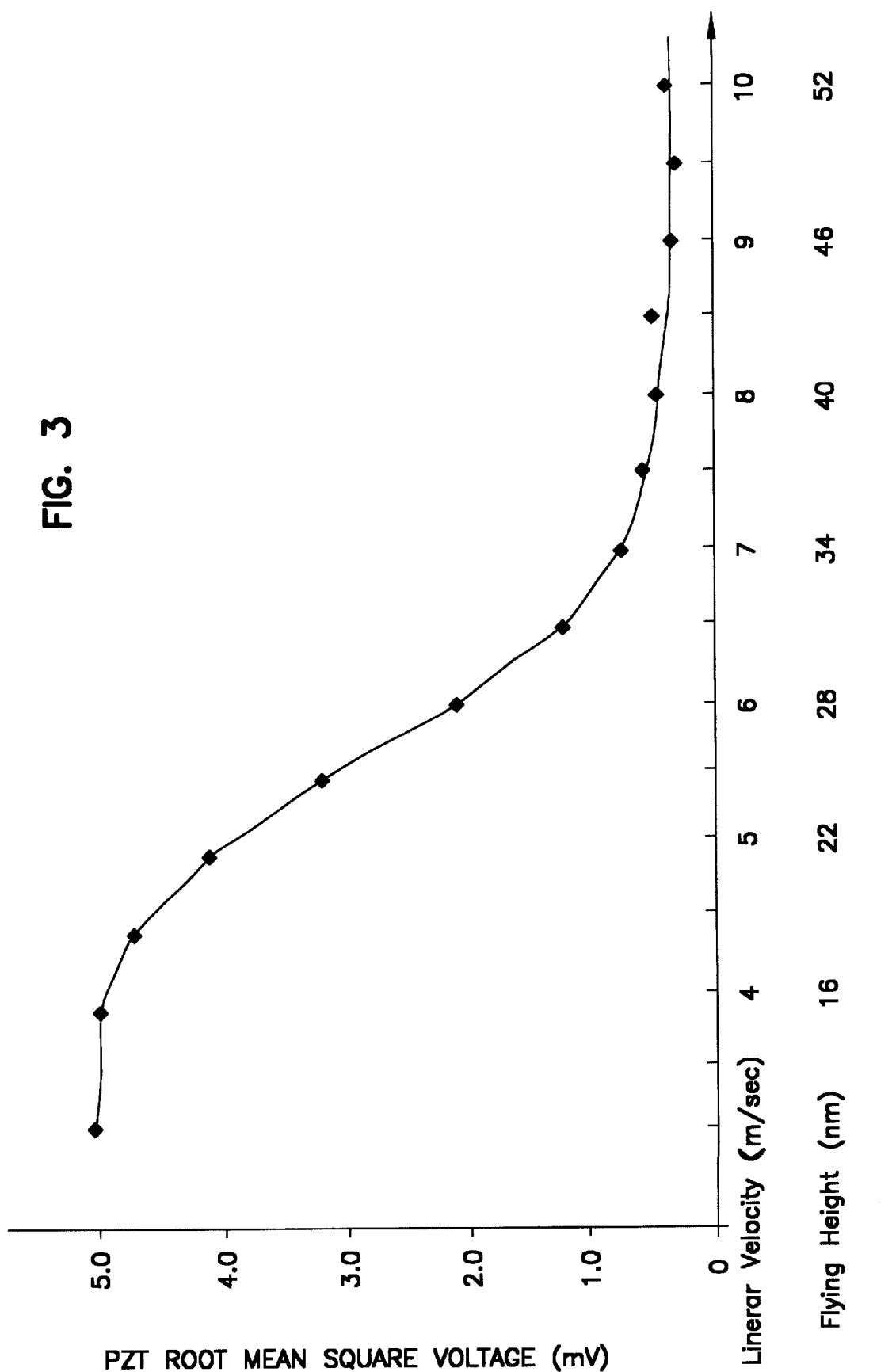
FIG. 3 is a graphical representation of the typical relationship between PZT voltage, head flying height and tangential disk surface velocity.

As shown in FIG. 3, the PZT voltage also has a relationship with the tangential velocity of the disk surface. At low tangential velocities, the PZT voltage is high because the air bearing has not yet pushed the head far enough away from the disk surface to prevent head-disk contacts. These head-disk contacts generate large and continuous acoustic waves that propagate from head-disk interface into suspension arms, the E-block and the rest of the disk drive where it is detected using the PZT's of the present invention. In contrast, at high tangential velocities, the PZT voltage decreases until a stable level is reached producing a relatively low and constant PZT voltage because at greater flying heights the frequency and magnitude of head-disk contact is greatly reduced, thereby reducing PZT voltage.

FIG. 4A depicts a disk drive performance profile. This performance profile is a radial map depicting the relationship of head-disk contact as a function of disk radius. The vertical axis represents PZT voltage (in mV) with the horizontal axis representing the radial distance of the head from the center of a disk (in cm). The small squares, 401, represent typical individual PZT measurements taken at discrete disk radii. The measurements are made while the head is flown over the disk surface at an operational flying height in a seeking mode which allows the entire surface of all the disks to be glidemapped. FIG. 4A shows a relatively normal head-disk interface, with a low PZT voltage, without much variation in PZT voltage throughout the map (i.e. this is an acceptable head-disk interface).

Figure 4B:
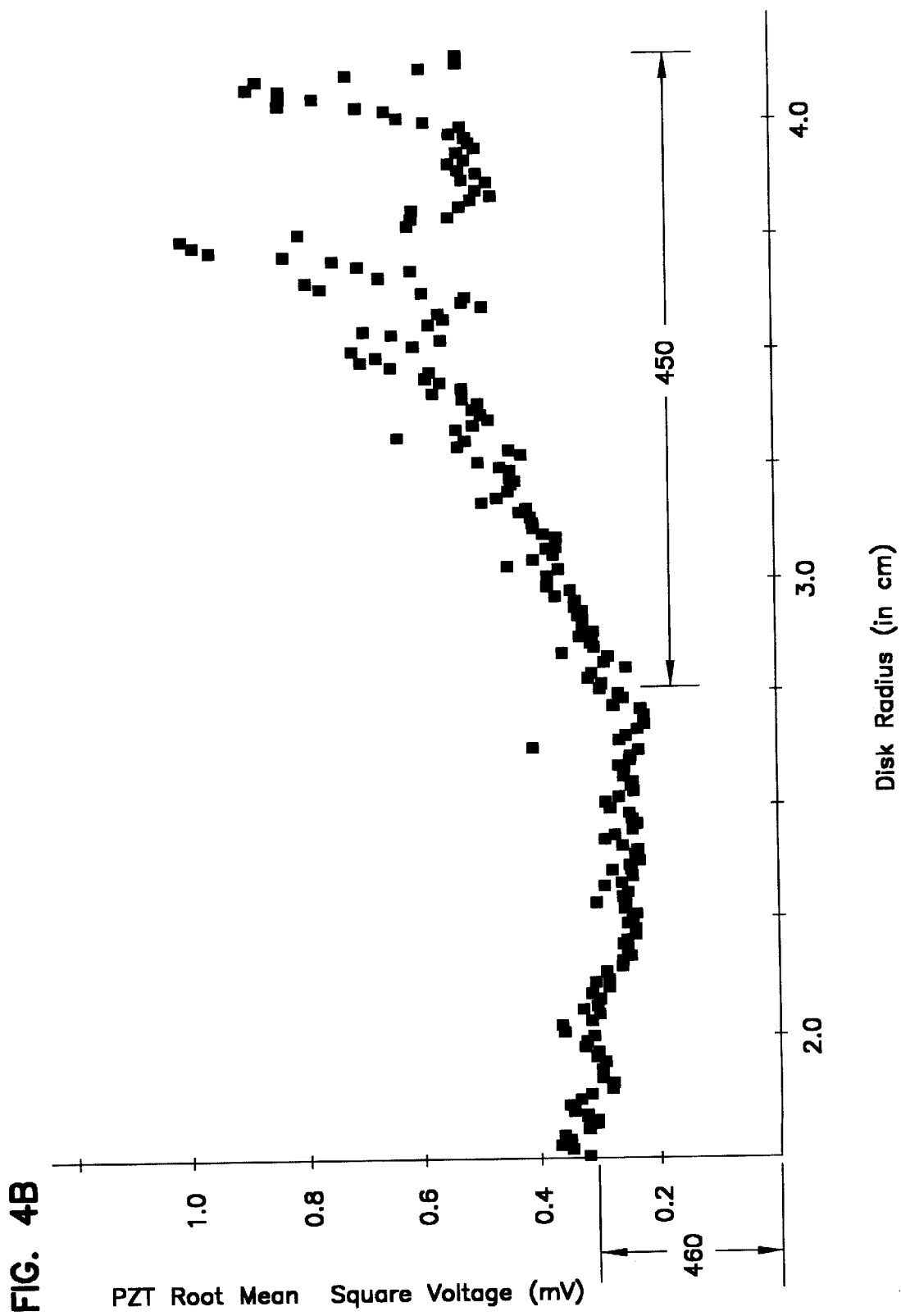
FIG. 4B is a glidemap plot showing the relationship between PZT voltage and disk radius where the disk is defective.

FIG. 4B depicts a performance profile similar to that depicted in FIG. 4A. The difference being that the disk drive of FIG. 4B is defective and should be rejected. Note the extremely erratic and high PZT voltage values in region, 450. This indicates excessive head-disk contact, specifically, at a region away from the disk hub at a radius of about 2.8 to 4.1 cm.

Figure 5A:
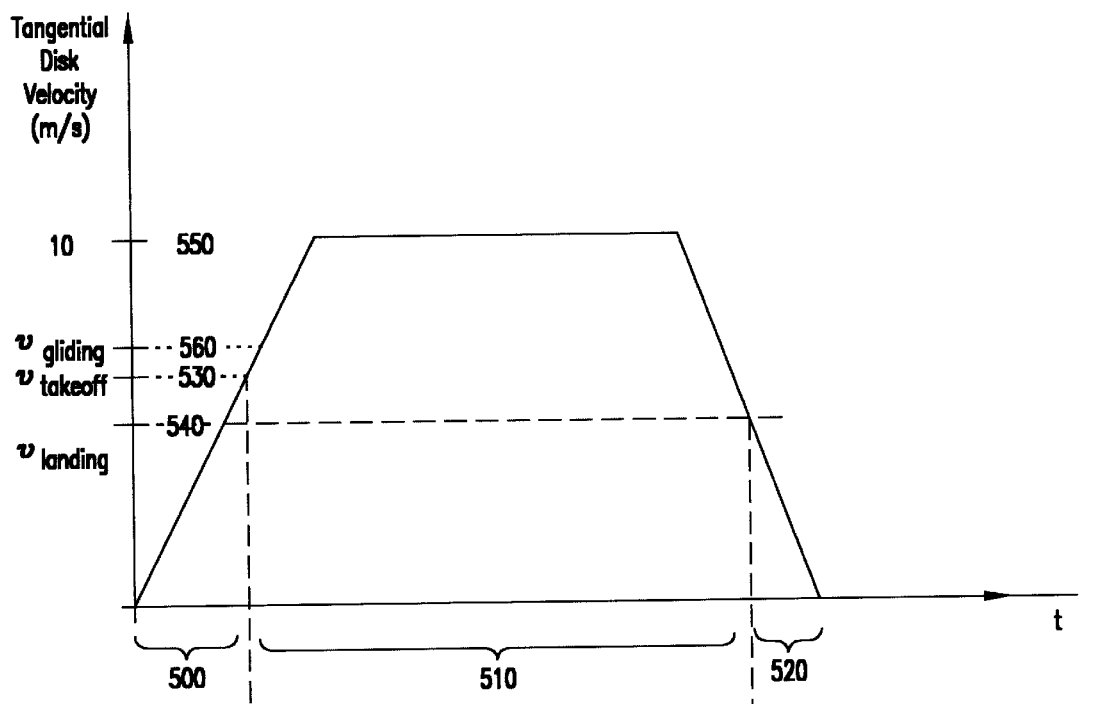
FIG. 5A is a graph of a typical disk drive run cycle showing tangential disk surface velocity as a function of time.
Figure 5B:
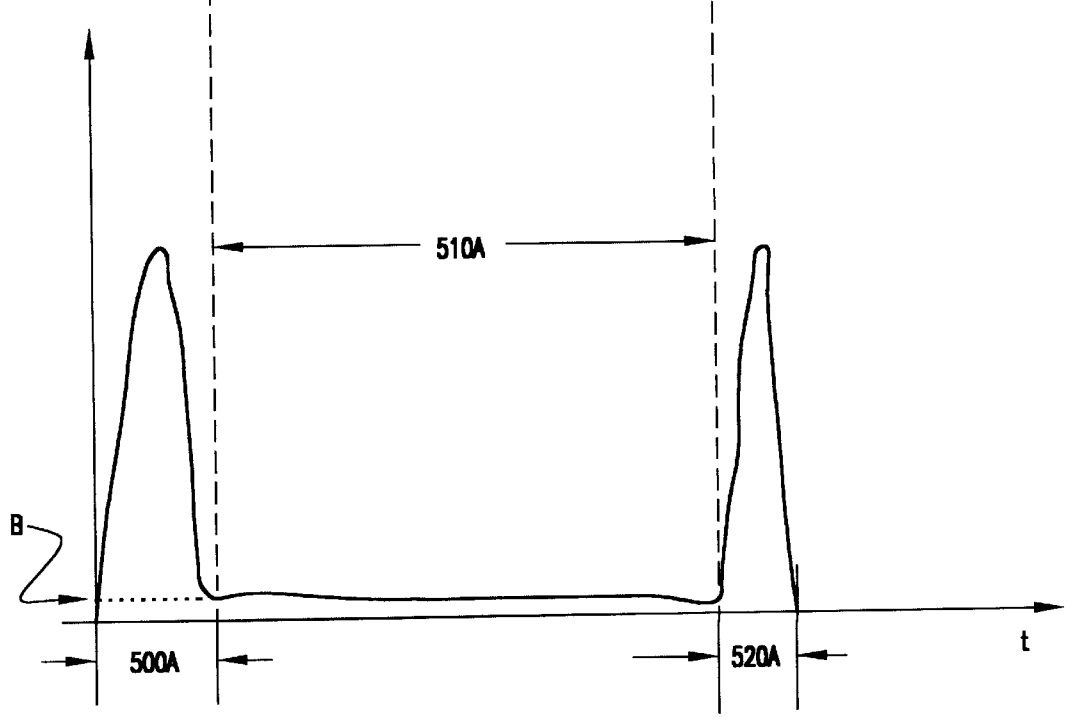
FIG. 5B is a graphical representation of the relationship between PZT voltage over time as related to the run cycle of FIG. 5A.

FIGS. 5A & 5B depict a typical disk drive run cycle for testing disk drives using the present invention. FIG. 5A graphically shows tangential velocity along the vertical axis and time along the horizontal axis. A typical test cycle features the following test regimes and parameters: take-off region, 500, threshold take-off velocity, $v_{takeoff}$, 530, flying region, 510, threshold landing velocity, $v_{landing}$, 540, and landing region, 520. $v_{takeoff}$, 530, is defined as the velocity at which head-disk contacts significantly decrease and PZT voltage drops to a background value (B). $v_{landing}$, 540, is defined as the velocity at which head-disk contact significantly increases and PZT voltage begins to rise (as shown by region 520A) above the background PZT voltage (B). An operational flying height velocity is also identified, 550. A gliding velocity, $v_{gliding}$, is also defined. The gliding velocity, 560, is typically, about 10–20% greater than $v_{landing}$ or $v_{takeoff}$. This gliding velocity, is associated with a gliding height and can be used to make glidemaps of all disk surfaces. Also, measurements of the takeoff and landing velocities are made. Deviations of these measurements from optimal values are detected by the present invention and used to determine if a drive meets rejection criteria.

As can be shown in FIG. 5B, voltage peaks exist in the take-off region 500A until $v_{takeoff}$ is reached, and also in the landing region 520A when the tangential velocity of the disk drops below $v_{landing}$. The threshold takeoff velocity, 530, is the velocity at which a transition occurs from high acoustic signal during head sliding and gliding, to the background signal (B) in flying region 510A. Similarly, threshold landing velocity, 540, is the velocity at which flying signal increases from the background signal (B), during landing 520A. The flying region, 510A, between these peaks can be analyzed for aberrant head-disk behavior. The head can be flown at a gliding height (which is less than operational flying height) over all surfaces, of all disks, to form a glide map. Voltage spikes in this region indicate head-disk contact during disk flying and are cause for rejection of the disk drive. Furthermore, excessive PZT voltages at the takeoff, 500A, and landing, 520A, peaks indicate that the friction between the head and the disk is too large and will result in fast degradation and drive failure.

The present invention uses sensors (typically, PZT's) attached to optimized positions in a disk drive with optimal force to maximize PZT voltage. In typical use, the sensors are clamped to various optimal locations on a disk drive. Subsequently, signals from the sensors are collected and analyzed during takeoff, landing, flying, seeking, and parking. These signals provide information concerning the mechanical integrity of the disk drive. Alternatively, the sensor need not be clamped to the disk drive, but may be permanently attached to the disk drive where it may remain for the life of the disk drive.

The present invention tests the mechanical integrity of the disk drive in a manner which accurately reflects the status of the head-disk interaction at all points on disk drive disk surfaces. This is accomplished by flying the head over all surfaces of the disks of a disk drive to form a collective glide map. Usually glide map data is obtained at a selected velocity or pressure, and provides a map of all disk surfaces at one point on the velocity and pressure avalanches, as are shown in FIGS. 2, 3 and 4A. FIGS. 2, 3 and 4A reflect desirable conditions for acquiring accurate glide maps.

Referring again to FIG. 4B, it can be seen that voltage avalanches are easily detectable when measurements are taken from a defective disk drive. The PZT voltage in region, 450, displays excessive and erratic behavior. This voltage is many times greater than an exemplar baseline PZT voltage 460. Such results may be quantified and used to determine whether a disk drive meets specifications. These results may also be used to quantify the nature and specific location of the defect. For instance, the location of an asperity on a disk surface may be pinpointed.

The presence of excessive PZT voltage during measurement of avalanche or glide maps are strong indicators that at least one head in the head-disk assembly does not have adequate head-disk clearance. The test does not need to differentiate between individual head-disk interfaces, because the failure of even one interface constitutes a disk failure requiring reworking or scrapping the entire disk drive. Insufficient head-disk clearance may result from a variety of problems (e.g., wrong air bearing, incorrect head suspension assembly, distorted suspension, wrong load, incorrect Z-height, distorted E-block, improperly clamped disks, distorted disks, asperities on disk surfaces, spindle with excessive run out, and other mechanical problems), all of which are detectable by the present invention.

SPECIFIC EMBODIMENTS OF THE INVENTION

One method of measuring the mechanical integrity of a disk drive is to temporarily attach a PZT to a disk drive, run the disk drive through a test cycle, conduct analysis on the PZT output and make a fitness determination. One embodiment of the present invention is to temporarily clamp a PZT onto an optimum location of a disk drive. Proper clamping should not interfere with the normal operation of the assembly disk drive, even during seeking. Additionally, the sensor should be positioned in such a way that signals from each individual head-disk interface contribute approximately equally to the measured signal. Clamping the sensor to the E-block of the disk drive actuator arm effectively accomplishes this goal. The sensor should also be clamped on the E-block in such a position as to prevent undue torque. To maximize the acoustic signal, and minimize the noise, mechanical contact between the sensor and drive component should be as tight as possible. The size and shape of the piezoelectric sensor should be selected for high signal to noise ratio. Electronic filtering of the PZT signal is used to differentiate head-disk signals from other sources of acoustic signal, in particular, the background noise generated by the disk drive spindle and actuator.

Figure 6:
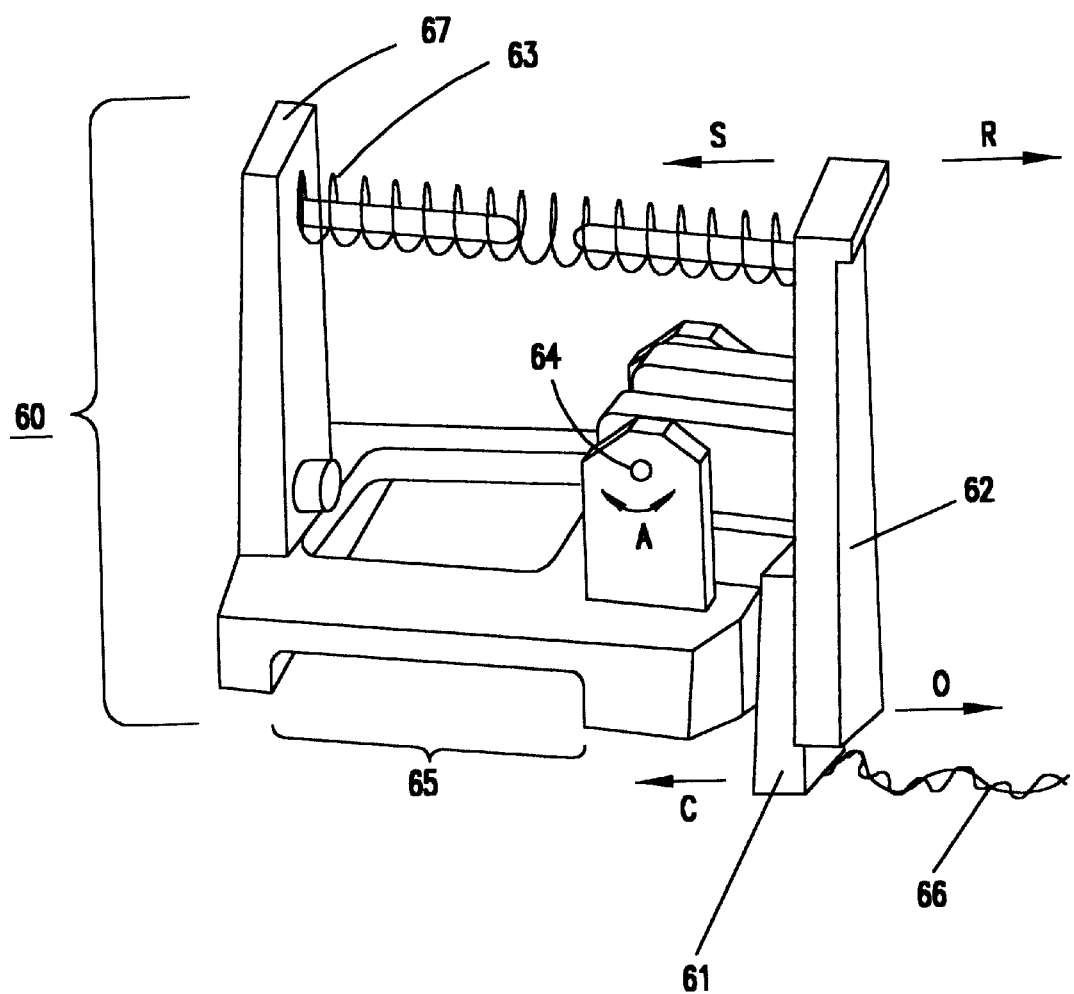
FIG. 6 is a perspective view of a clamp embodiment.
Figure 7:
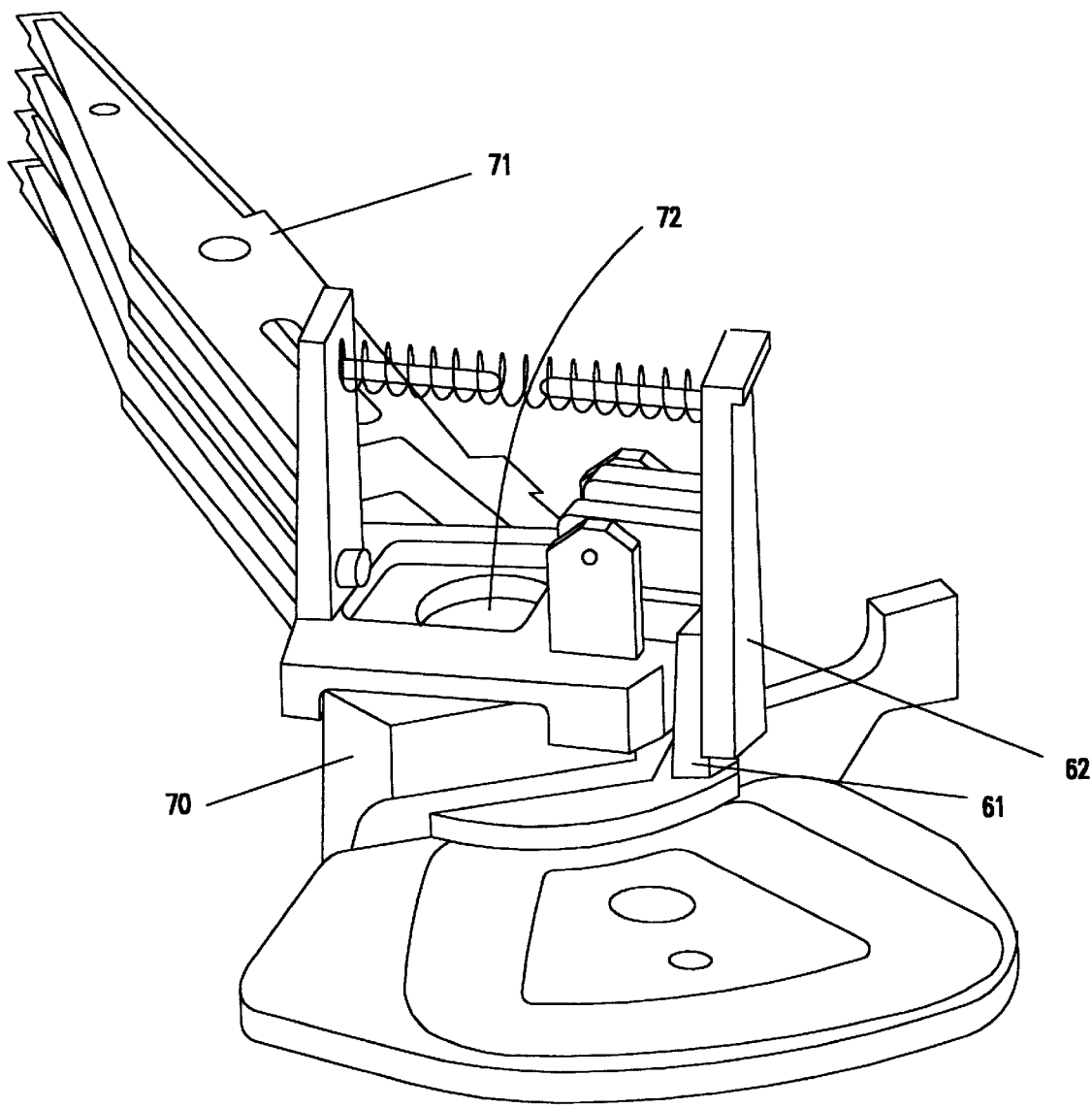
FIG. 7 is a perspective view of a clamp mounted on a disk drive E-block.

A preferred embodiment is shown in FIGS. 6 and 7. FIG. 6 depicts a "scissors clamp" embodiment. The clamp 60 features a PZT 61 mounted on a movable clamping arm 62. A sufficient amount of clamping force is supplied by a spring 63. The clamp is applied by compressing the spring 63 in direction S, compressing the spring 63 between the clamping arm 62 and a stationary arm 67. This causes clamping arm, 62, to rotate about pivot pin, 64, in direction A, which causes the other end of arm, 62, to move in direction O. This opens the clamp which is then placed in position on the E-block (not shown) of a disk drive. The clamp 60 features a mounting bracket 65 on the bottom of the clamp. This bracket 65 is shaped to fit said E-block (not shown) in a self-aligning manner. Thus, the clamp fits onto the same location on a series of E-blocks allowing good reproducible results. Once in position on the E-block, the spring 63 is released, moving the arm 62 in direction R which causes the other end of the arm 62 and the sensor 61 to compress in direction C. Once released, the clamp tightly compresses the PZT 61 against the E-block (not shown). After placement, the disk drive may be tested. PZT signal is sent through wires 66 for further processing. It should be noted that the invention may be practiced with large variety of clamps, so long as they do not interfere with the operation of the disk drive and sufficient compressive force is applied to hold the PZT against the disk drive such that an acceptable sensor signal is received.

FIG. 7 depicts the scissors clamp of FIG. 6 clamped to the E-block, 70, of a disk drive. Using the self-alignment bracket, the scissors clamp is positioned above the axis of the rotating actuator pivot bearing, 72, to prevent actuator imbalances. One flat surface of the piezoelectric sensor, 61, is pressed with substantial force against a flat surface of the E-block 70. Clamping force must be sufficient to generate a large acoustic emission signal, but at the same time not so tightly clamped as to make it difficult to remove later.

Figure 8:
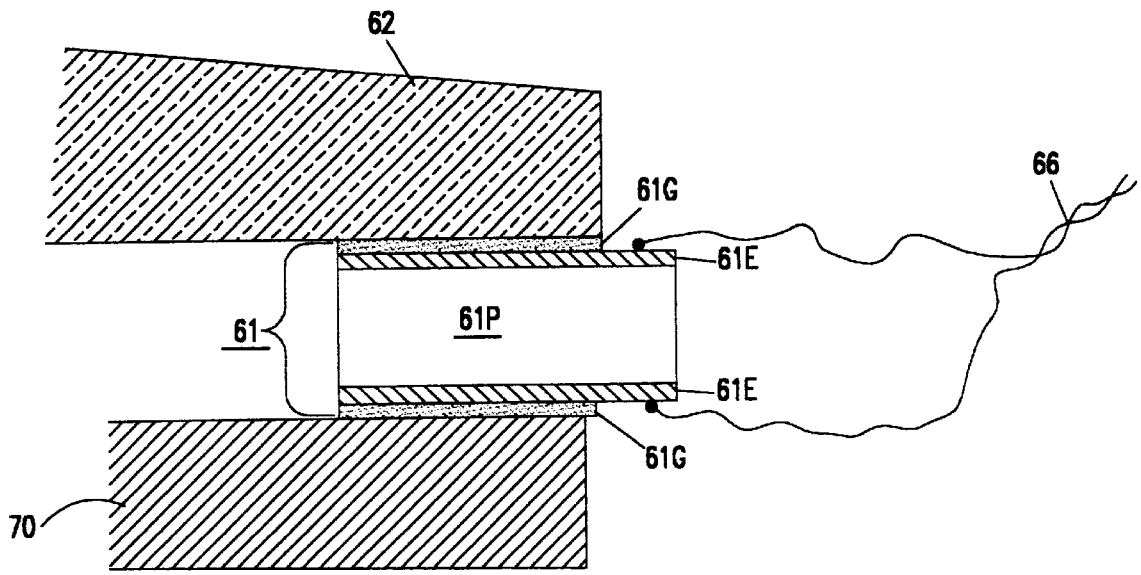
FIG. 8 is a side view of a sensor clamped against a disk drive.

FIG. 8 shows a preferred embodiment of a PZT 61, in position between a clamp arm, 62, and the E-block 70. The sensor 61 features a piezoelectric element 61P constructed of a piezoelectric material such as lead zirconium titanate, strontium titanate, zinc oxide, or any of a variety of other piezoelectric materials. The sensor 61 typically features at least one, but preferably two electrodes, 61E, each of which is electrically insulated from the clamp arm 62 and from the E-block, 70, by thin layers of dielectric material, 61G, such as glue. The electrodes, 61E, are connected to a wire, 66, for carrying PZT signal. The output signal generated by the PZT is detected differentially. Alternatively, one of the electrodes may be grounded, allowing the other electrode to transmit PZT output signal in a single-ended mode.

Other clamps or attachment configurations are possible, including mounting the sensor outside of the drive or on the suspensions (e.g. 71 of FIG. 7). However, the E-block embodiment is preferred because external mounting provides poor sensitivity to the head-disk interactions and mounting on the suspension or the suspension arm gives very good signal from one interface, but very poor signal from the remaining interfaces. Furthermore, clamping sensors on the suspension commonly interferes with the operation of the drive.

Figure 9:
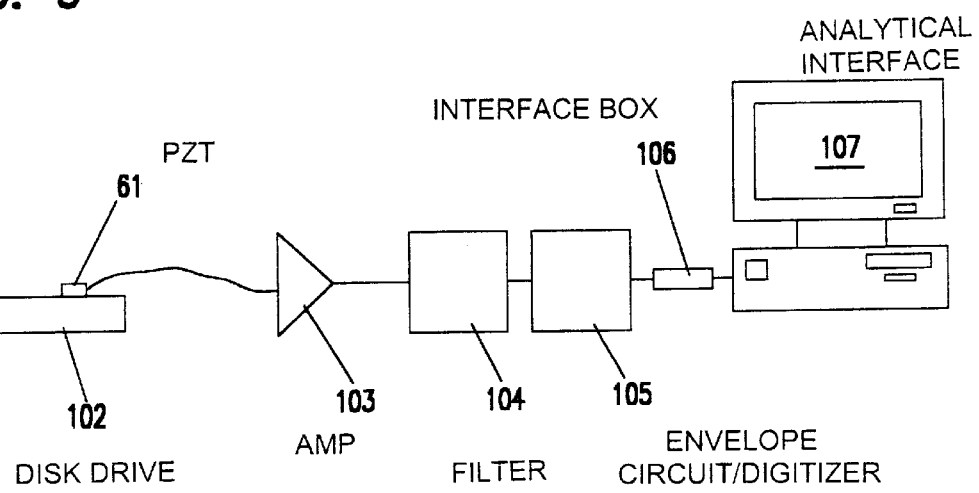
FIG. 9 is a block diagram of a typical system for analyzing disk drive performance.

FIG. 9 is a block diagram of a typical analytical system used in the present invention. Typically, the electrical signal from the PZT, 61, is detected differentially, without grounding of either of the electrodes. However, it should be noted that a single ended signal can also be used. This signal, whether detected in a differential or single-ended mode, is amplified, filtered, and digitized for subsequent analysis, as shown in FIG. 9. Prior to testing, the PZT, 61, is clamped to disk drive 102. During testing, the PZT, 61, produces a signal which is amplified by an amplifier means, 103, and filtered using, for example, a 200 kHz high pass filter, 104, which is intended to cut extraneous signal noise (for example, that produced by actuator arms, disk drive motor and spindle bearings etc.) A wide range of high pass filters may be used, but high pass filters between 100 kHz and 1 MHz are typically used. Once filtered, the signal is measured using a root-mean-squared voltmeter or the signal may optionally be passed through an envelope circuit/digitizer 105. The signal is then digitized and run through an interface box, 106, and fed into an analytical interface, 107, for graphic display and/or analysis. A typical interface, 107, is a computer.

Figure 10:
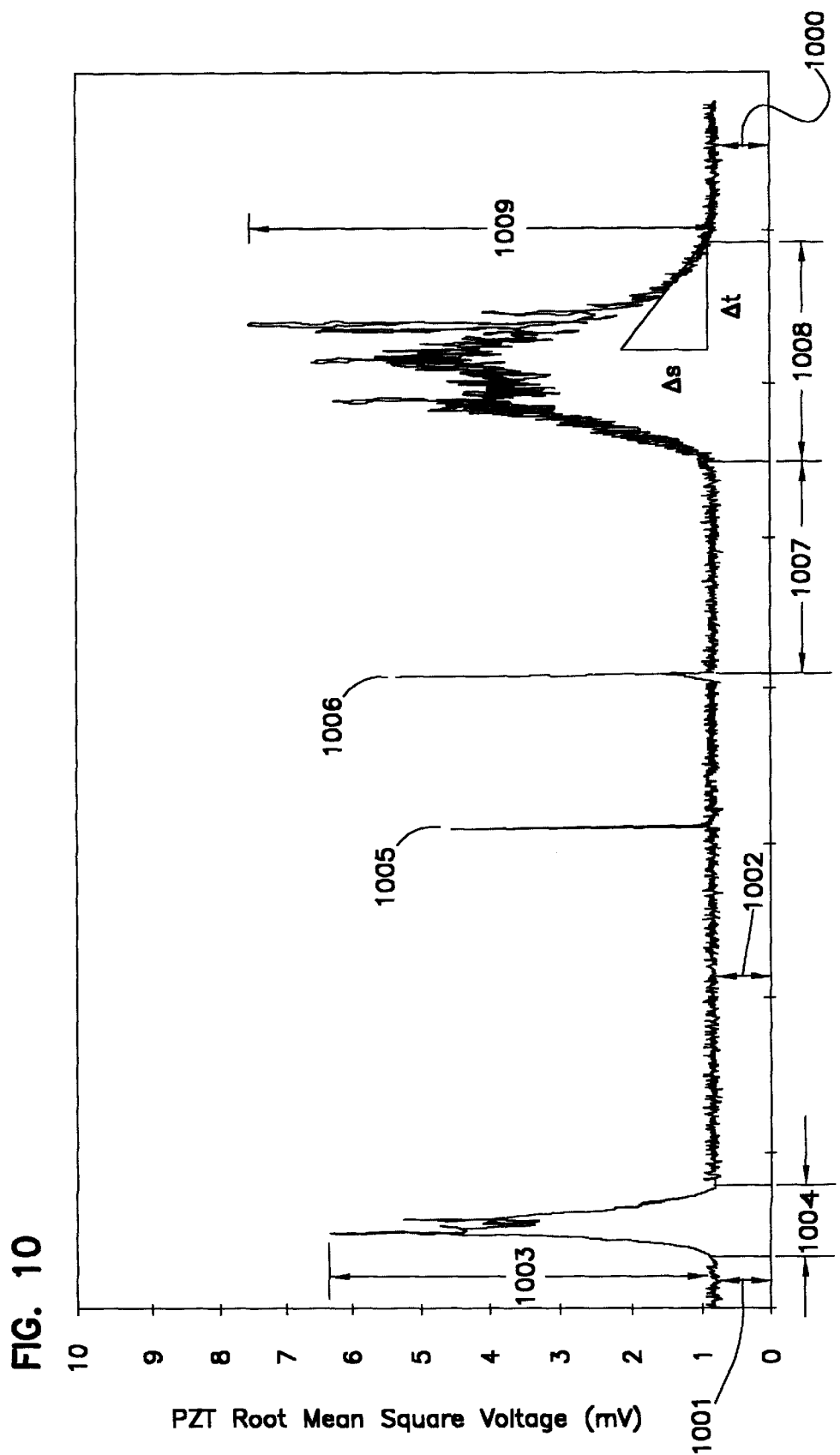
FIG. 10 is a graphical representation of a typical disk drive test cycle showing a number of testable parameters as functions of PZT voltage and time.

A complete test takes typically between 10–20 seconds. In addition to glidemapping the surface, key parameters may be examined to determine disk drive reliability. Typically, one run cycle (as shown in FIG. 10) provides enough information to determine a number of characteristic parameters. Each of these parameters, or subsets thereof, may be used to determine whether the disk drive meets the required specifications. Sophisticated data analysis including artificial intelligence, learning software, pattern recognition, fuzzy logic, or even simple human observation may be used to make determinations about disk drive quality.

An exemplar performance profile is shown as FIG. 10, which relates to a standard disk drive. A background signal 1001 is determined by measuring the acoustic emission signal when drive motor spindle is stationary. A baseline flying signal 1002 is defined by the background signal (noise) 1001 and the acoustic emission signal produced by the heads during flying. An additional important parameter is the magnitude of the start-up peak 1003, which is the maximum acoustic emission during disk drive start-up (take off). Related to the start-up peak, 1003, is the duration of the starting transient 1004. This is defined as the time period from the time power is supplied to the drive spindle until the time when the last head lifts off from direct contact with a disk surface. The effect is shown by the characteristic voltage spike 1003. Another useful parameter may be determined during stopping. The time period, 1007, is the time interval between the time when spindle drive power is terminated and the time when the first head contacts a disk surface during the subsequent deceleration. The landing transient 1008 is the time between first head-disk contact until complete stop of the drive spindle. 1009 is the magnitude of the maximum acoustic emission signal during the landing transient 1008, also known as the landing peak. Finally, two narrow but distinctive spikes arise out of the baseline signal 1002. The first voltage spike 1005 corresponds to actuator contact with the outside crash stop during seeking from inside to outside disk diameter. Correspondingly, the voltage spike 1006 corresponds to actuator contact with the inside crash stop during seek from outside to inside disk diameter.

In addition to glidemapping the entire disk surface with a head at gliding height, the previously disclosed parameters may also be used to determine the mechanical reliability of disk drives. The following examples show how these parameters may be used to formulate disk drive rejection criteria. The baseline flying signal 1002 is compared to the background signal (noise) 1001. It is expected that the magnitude of the baseline flying signal 1002 is greater than or equal to that of the background flying signal 1001. However, if 1002 exceeds a•1001, head-disk contact is excessive and the disk drive should be rejected. The variable, a, depends on the specific disk drive, but is typically about 1.1. Another example uses the magnitude of the start up peak, 1003, or the landing peak 1009. A satisfactory drive has start up peak 1003 magnitude less than $c_1$ and a landing peak 1009 magnitude less than $c_2$. The variables $c_1$ and $c_2$ are dependent on the type of disk drive being tested and the type of PZT used and its attachment to the drive. Each c value is characteristic for the type of disk drive in question and predetermined experimentally prior to testing. If the peaks (1003 or 1009) exceed a set, c, value ($c_1$ or $c_2$ respectively) the disk drive is defective.

Takeoff and landing velocities are also key parameters which may be used as rejection criteria. Takeoff and landing velocities are determined using velocity markers which surround the regions of interest. Typically, a spindle index signal is used as a velocity marker. The index signal is used because disk velocity and acceleration characteristics typically vary from spindle to spindle. However, the time between magnetic transitions recorded at fixed frequencies can also be used to determine instantaneous velocities. If the takeoff velocity, vtakeoff, exceeds a maximum value the drive is defective. Also, if the landing velocity, vlanding, exceeds a maximum value the drive is defective. Also, vtakeoff should be approximately the same as vlanding.

Another useful rejection criteria is the determination of the stiction index. The stiction index is determined by the slope of the acoustic emission signal at the end of the landing transient (as shown in FIG. 10). This parameter is indicative of the static friction coefficient between the heads and the disk. The stiction index is defined as $\Delta S/\Delta t$, where $\Delta t$ is typically between 0.2–0.5 seconds. If the stiction index exceeds a value, s, then the disk drive is defective and should be rejected. The variable s is dependent on the type of disk drive being tested and on the type of PZT used. The value, s, is characteristic for each type of disk drive in question and predetermined experimentally prior to testing. Another example of a parameter that may be used to determine drive reliability is an integrated signal. For example, if the emission signal V(t) is integrated over the takeoff time period 1004, a value, $E_t = \int V(t)dt$ is determined. Also, if the emission signal V(t) is integrated over the landing period 1008, a value, $E_1 = \int V(t)dt$, may be determined. A satisfactory drive has a takeoff integral value $E_t$ of less than $L_1$ and a landing integral $E_1$ of less than $L_2$. The variables $L_1$ and $L_2$ are dependent on the type of disk drive being tested as well as the type of PZT used. Each L value is characteristic for the type of disk drive in question and is predetermined experimentally prior to testing.

Another possible, parameter involves the measurement of signal resulting from impacts with crash stops (1005 and 1006). A defective disk drive PZT signal resulting from impact with an outside crash stop, 1005, exceeds $i_1$, whereas PZT signal resulting from impact with an inside crash stop 1006 should not exceed $i_2$. The variables $i_1$ and $i_2$ are dependent on the type of disk drive being tested and the type of PZT used. Each i value is characteristic for the type of disk drive in question and predetermined experimentally prior to testing.

In addition to testing "contact start-stop" disk drives, the present invention may also be advantageously employed to analyze so called "load-unload" disk drives. Unlike standard disk drives where the head rests on the disk surface at start up, load-unload drives are designed to bring the head assembly onto an already moving disk surface without head-disk contact. Typically, load-unload drives feature ramps which bring the head-gimble assemblies from an unloaded position on the ramp to a loaded position with the head flying over an already moving disk surface. A typical start up cycle for a load-unload drive begins with supplying power to the spindle which accelerates to the desired velocity. The head is then loaded onto the disk surface. During stopping, the heads of a load-unload drive are unloaded onto the ramp prior to the spindle stopping. Since there is ideally no head-disk contact during loading or unloading of load-unload drives, a different approach is needed to determine when the head-disk interface spacing reaches zero. Without this information a determination of head flying height is not possible.

FIGS. 11A and 11B show performance profiles used in testing load-unload type disk drives and graphically show a typical test cycle for a load-unload drive using the present invention. Referring now to FIGS. 11A and 11B, the drive begins the test cycle unpowered. At some time, 1101, power is supplied to the drive spindle motor which accelerates the disk surface to operating velocity, $v_{operating}$. The head is then loaded onto the disk surface where the air bearing pressure prevents head disk contact. The ramp loading generates a loading spike, S, which is not effective in determining takeoff or landing velocities. However, as shown in FIG. 11B, there is a background PZT voltage signal, B, which can be compared to the background flying signal, F, while the head is flying over the disk surface, much the same way as these two signals are compared in a contact start-stop type disk drive. Subsequently, the power to the spindle motor is cut (as shown by 1102) resulting in a gradual reduction of disk speed over time period 1103. As a result of the steadily decreasing disk speed, pressure on the head decreases, causing the head to begin contacting the disk surface. This is reflected by an increase in the PZT signal at time, 1104. This signal increase defines landing velocity, $V_{landing}$. Once $V_{landing}$ is determined, power is again supplied to the spindle motor causing an increase in disk velocity. At time, 1105, when the disk surface reaches $V_{takeoff}$, the head again rises from the disk surface. As a consequence, the PZT signal decreases back to the background flying signal, F. Between $V_{takeoff}$ and $V_{operating}$ lies a gliding velocity, $V_{gliding}$, where the head flies some small distance above the surface of the disk, but lies below the standard operational flying height of the disk drive. Typically, $V_{gliding}$ is about 10–20% greater than $V_{takeoff}$ or $V_{landing}$. Since, at $V_{gliding}$, the head flies just above the disk surface, the head may be used to glide map all surfaces of the disk. This glide map determines whether or not the disk drive meets specifications.

Digitization during glide mapping can be used to detect localized defects in the magnetic media surface. Furthermore, rather than making a glide map of the entire disk surface, a single track of a disk may be selected and mapped. This track following method allows the specific source and location of the defect to be identified. Also, a Fourier transform of the PZT signal may be used to acquire a power spectrum and pinpoint the source of the mechanical defect.

ADDITIONAL EMBODIMENTS

Figure 12A:
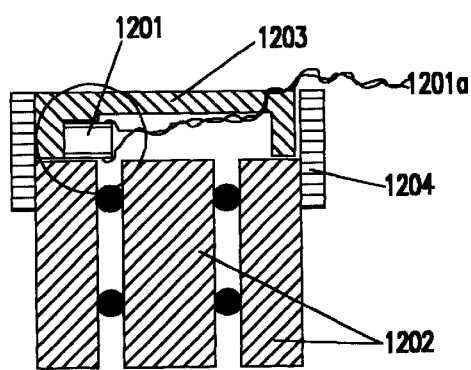
FIG. 12A is a section view of a disk drive pivot bearing and a mounted magnetic clamp of the present invention.
Figure 12B:
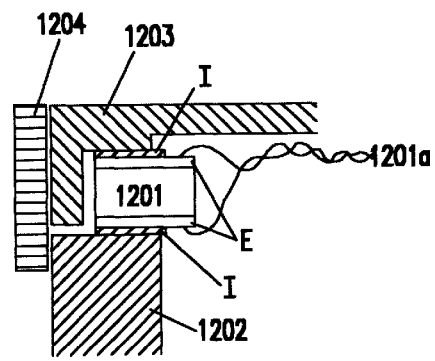
FIG. 12B is a blow up sectional view of the window of FIG. 12A highlighting specific features of the magnetic clamp embodiment of the present invention.
Figure 13:
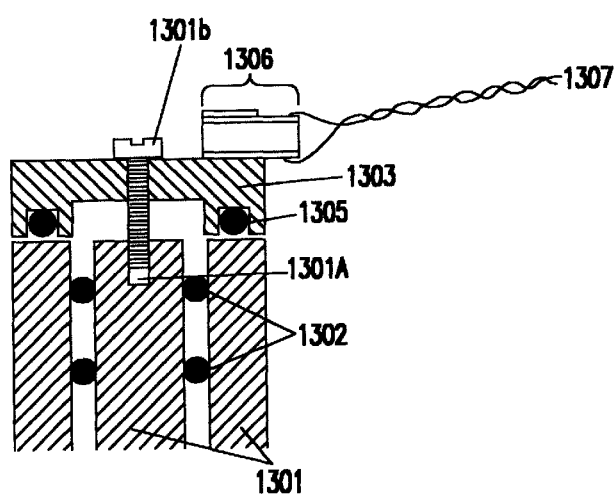
FIG. 13 is a sectional view of a ball bearing sensor embodiment mounted on the actuator pivot bearing of a disk drive.
Figure 14:
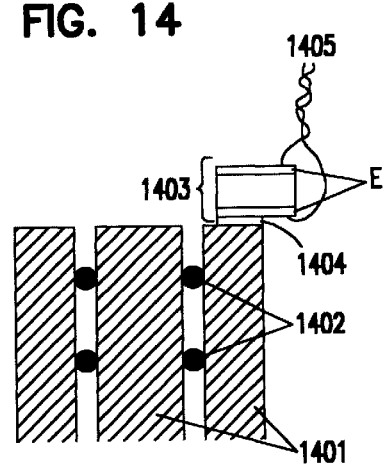
FIG. 14 is a cross-sectional view of a permanent sensor embodiment mounted on an actuator pivot bearing of a disk drive.

The present invention may also be practiced using several alternative embodiments which include a magnetic clamp embodiment pictured in FIGS. 12A, 12B, 13 and a permanently mounted sensor shown in FIG. 14.

The magnetic clamp embodiment depicted in FIG. 12A shows a piezoelectric sensor, 1201, mounted on top of the actuator pivot bearing 1202. The sensor, 1201, is clamped firmly against the top of the pivot bearing by a U-shaped magnet 1203. The magnet must be strong enough to firmly compress the sensor, 1201, against the top of the actuator pivot bearing, 1202, so that a strong head-disk signal, easily differentiated from other sources of acoustic signal, is produced by the sensor. The U-magnet, 1203, is kept in alignment through the presence of a non-magnetic alignment collar 1204. The U-magnet, 1203, may optionally be connected to the alignment collar, 1204, to form a single, readily removable, structure. The signal from the sensor, 1201, is sent to analyzing instrumentation through sensor wires 1201a.

FIG. 12B is an enlarged view of circled section of FIG. 12A, showing the piezoelectric sensor, 1201, mounted on top of the actuator pivot bearing 1202, as shown in FIG. 12A. The sensor, 1201, is clamped firmly against the top of the pivot bearing by a U-shaped magnet, 1203, and kept in alignment by the collar 1204. The sensor features dielectric materials (I) which electrically isolate the sensor electrodes (E) from the pivot bearing, 1202, and the U-magnet 1203. The signal from the sensor is sent to analyzing instrumentation through sensor wires 1201a.

Another embodiment of the invention is depicted by FIG. 13. In FIG. 13, the two components of the actuator pivot bearing, 1301, pivot around each other using a first set of ball bearings 1302. A bracket, 1303, is secured to the inner portion of the actuator pivot bearing using a screw, 1301B, threaded through an opening in the top, 1301A, of the actuator pivot bearing 1301. The bracket is mounted on a second set of ball bearings, 1305, which allow the bracket, 1303, to remain fixed above the actuator pivot bearing, 1301, without impeding its operation. A piezoelectric sensor, 1306, is affixed to the bracket 1303. Typically, the sensor will be attached using an adhesive, such as epoxy or glue, which also serves as an electrical insulator, preventing electrical contact between the sensor, 1306, and the bracket 1303. Electrical wires, 1307, carry the signal from the sensor to the analyzing instrumentation of the present invention.

Yet another embodiment is shown in FIG. 14. A piezoelectric sensor, 1403, is affixed to the actuator pivot bearing, 1401, which pivots about a set of ball bearings 1402. The sensor, 1403, is affixed to the actuator pivot bearing, 1401, using any of the typical methods known to one with ordinary skill in the art. A preferred embodiment uses adhesives, such as glue or epoxy, 1404, to affix the sensor, 1403, to the pivot bearing 1401. The adhesives, 1404, may be advantageously chosen to electrically isolate the electrodes, E, of the sensor, 1403, from the pivot bearing 1401. Once affixed, the sensor, 1403, produces signals which are carried by electrical wires, 1405, to the analyzing instrumentation of the present invention. An additional advantage of this embodiment is that the sensor, 1403, may remain permanently affixed to the disk drive allowing testing of the disk drive at any time in the future. This allows disk drives to be tested throughout their operational life to identify failure precursors. The previously disclosed techniques and parameters may be used to identify drives which are near failure. This allows a user to anticipate possible disk drive failure and prevent loss of the data stored on the disk drive.

The location of these sensors on top of the pivot bearing is preferred because it receives approximately equal signal from each head-disk interface and it receives a strong signal. If the sensors are mounted on the outside of the head-disk assembly the signal strength and sensitivity would be significantly reduced. Further, mounting sensors on a suspension is not optimal because, although strong signal is obtained relative to one head-disk interface, the signal is drastically reduced with respect to the remaining interfaces.

The present invention has been particularly shown and described with respect to certain specific embodiments and features. However, it is readily apparent to those with ordinary skill in the art that various changes and modifications in form and detail may be made without departing from the spirit and scope of the inventions set forth in the claims. Especially apparent is that a wide variety of piezoelectric materials may be used in the sensors of the present invention. Also, it is noted that a wide variety of shapes, forms, and types of removable clamps can be used and still be within the scope of the invention. Finally, the invention disclosed herein may be practiced without any element not specifically disclosed herein.

I claim:

1. An apparatus for testing the mechanical integrity of a disk drive head-disk assembly comprising:

a piezoelectric sensor for producing an output signal;

a signal processing means for receiving and analyzing the output signal; and a clamp configured for attaching the piezoelectric sensor to an E-block of the disk drive.

2. An apparatus as in claim 1 wherein said disk drive is a load-unload disk drive.

3. The apparatus of claim 1, wherein said piezoelectric sensor further comprises two electrodes which transmit said output signal in either a differential or single-ended mode.

4. An apparatus as in claim 1, wherein said clamp comprises a readily removable mechanical clamp.

5. An apparatus as in claim 4, wherein said mechanical clamp further comprises a self-aligned clamp.

6. An apparatus as in claim 1, further comprising means for effecting a periodic reevaluation of said disk drive.

7. An apparatus as in claim 1, wherein said clamp comprises a magnetic clamp for holding said sensor in contact with said disk drive.

8. An apparatus as in claim 1, wherein said clamp comprises a ball bearing clamp.

9. A method for testing the mechanical integrity of a disk drive, comprising steps of:

a) attaching a piezoelectric sensor to a head-disk assembly of said disk drives using a clamp configured for attaching the piezoelectric sensor to an E-block of the disk drive;

b) operating said disk drive through a test cycle while measuring an output signal generated by said sensor, said output signal containing disk drive rejection criteria based on the frequency and magnitude of head-disk contact;

c) processing said output signal to generate a performance profile; and d) analyzing said profile to determine whether said disk drive meets predetermined rejection criteria.

10. A method as in claim 9, wherein said disk drive is a load-unload type of disk drive.

11. A method as in claim 9, wherein said test cycle is conducted prior to final assembly and servowriting of said head-disk assembly.

12. A method as in claim 9, wherein said test cycle is conducted after final assembly and servowriting of said head-disk assembly.

13. A method as in claim 9, wherein said profile represents a glide map of at least one head-disk interfaces.

14. A method as in claim 9 wherein said analyzing step, d), comprises using the ratio of a baseline flying signal to a background signal to determine a rejection criteria.

15. A method as in claim 9 wherein said analyzing step, d), comprises using the magnitude of a landing peak or a takeoff peak, to determine a rejection criteria.

16. A method as in claim 9 wherein said analyzing step, d), comprises using the stiction index to determine a rejection criteria.

17. A method as in claim 9 wherein said analyzing step, d), comprises integrating said output signals to determine a rejection criteria.

18. A method as in claim 9 wherein said analyzing step, d), comprises using takeoff and landing velocities to determine a rejection criteria.

* * * * *